US008244039B2

(12) United States Patent
Nishida

(10) Patent No.: US 8,244,039 B2
(45) Date of Patent: Aug. 14, 2012

(54) APPARATUS, METHOD, AND COMPUTER PROGRAM PRODUCT FOR ACQUIRING PROCESSING CONTENT FOR IMAGE DATA

(75) Inventor: Hirobumi Nishida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1090 days.

(21) Appl. No.: 12/213,581

(22) Filed: Jun. 20, 2008

(65) Prior Publication Data

US 2009/0016648 A1 Jan. 15, 2009

(30) Foreign Application Priority Data

Jul. 12, 2007 (JP) ................................. 2007-183000
Apr. 18, 2008 (JP) ................................. 2008-109312

(51) Int. Cl.
*G06K 9/46* (2006.01)
*G06K 9/00* (2006.01)
*G06K 9/62* (2006.01)
*G06F 7/00* (2006.01)

(52) U.S. Cl. ......... 382/190; 382/115; 382/224; 707/706
(58) Field of Classification Search ................. 382/190, 382/115, 224; 707/706
See application file for complete search history.

(56) References Cited

U.S. PATENT DOCUMENTS

| 5,608,819 | A | 3/1997 | Ikeuchi | |
|---|---|---|---|---|
| 7,437,024 | B2 * | 10/2008 | Baum et al. | 382/311 |
| 7,489,802 | B2 * | 2/2009 | Smilansky | 382/103 |
| 7,583,832 | B2 | 9/2009 | Okuda et al. | |
| 7,796,284 | B2 * | 9/2010 | Someya | 358/1.15 |
| 7,817,156 | B2 * | 10/2010 | Ichieda | 345/522 |
| 2002/0054224 | A1 * | 5/2002 | Wasula et al. | 348/232 |
| 2003/0065590 | A1 * | 4/2003 | Haeberli | 705/27 |
| 2004/0131231 | A1 * | 7/2004 | Smilansky | 382/103 |
| 2004/0135887 | A1 * | 7/2004 | Tecu et al. | 348/207.1 |
| 2005/0031220 | A1 | 2/2005 | Nishida | |
| 2005/0213811 | A1 | 9/2005 | Nishida | |
| 2006/0044623 | A1 | 3/2006 | Morimoto et al. | |

(Continued)

FOREIGN PATENT DOCUMENTS

JP 07-037087 2/1995

(Continued)

OTHER PUBLICATIONS

Roberto Paredes et al.: "Learning Weighted Metrics to Minimize Nearest-Neighbor Classification Error", IEEE Transactions on Pattern Analysis and Machine Intelligence, vol. 28, No. 7, Jul. 2006.

(Continued)

*Primary Examiner* — Kathleen Y Dulaney
(74) *Attorney, Agent, or Firm* — Harness, Dickey & Pierce, P.L.C.

(57) ABSTRACT

A first combination of feature and processing content of image data is stored in a storing unit in a first period, and a second combination of feature and processing content of image data is stored in the storing unit in a second period that is later in terms of time. When a change in processing content is detected between the first period and the second period, an updating unit updates the first combination to the second combination. An acquiring unit acquires a processing content for target image data based on a combination of feature and processing content stored in the storing unit. An output unit outputs the processing content acquired by the acquiring unit.

14 Claims, 14 Drawing Sheets

U.S. PATENT DOCUMENTS

2007/0143467 A1* 6/2007 Takahashi .................... 709/223
2008/0002892 A1* 1/2008 Jelonek et al. ................ 382/224

FOREIGN PATENT DOCUMENTS

| | | |
|---|---|---|
| JP | 10-283458 | 10/1998 |
| JP | 11-185034 | 7/1999 |
| JP | 2003-281526 | 10/2003 |
| JP | 2004-077165 | 3/2004 |
| JP | 2004-297786 | 10/2004 |
| JP | 2004-320701 | 11/2004 |
| JP | 2005-063055 | 3/2005 |
| JP | 2005-110184 | 4/2005 |
| JP | 2005-284366 | 10/2005 |
| JP | 2006-053690 | 2/2006 |
| JP | 3768052 | 2/2006 |
| JP | 2006-074331 | 3/2006 |
| JP | 4118749 | 5/2008 |

OTHER PUBLICATIONS

Abstract of JP 2001-169080 published Jun. 22, 2001.
Japanese Office Action dated Oct. 18, 2011.
Abstract of JP 2004-320701 published Nov. 11, 2004.

* cited by examiner

FIG.9

| IMAGE DATA | | (a) | (b) | (c) | (d) | (e) | (f) | ... |
|---|---|---|---|---|---|---|---|---|
| FEATURE | RATIOS OF CHARACTERS AND PICTURES | 25.2%, 65.9% | 43.4%, 5.5% | 26.4%, 0.0% | 9.3%, 65.9% | 48.3%, 45.0% | 37.9%, 0.0% | ... |
| | LAYOUT DENSITY | 94.3% | 71.0% | 30.5% | 75.2% | 96.6% | 63.8% | ... |
| | DEGREES OF SCATTERING OF CHARACTERS AND PICTURES | 1.13, 1.24 | 0.78, 0.07 | 1.21, 0.0 | 1.44, 0.96 | 0.98, 0.86 | 0.62, 0.0 | ... |
| | ... | ... | ... | ... | ... | ... | ... | |
| PROCESSING CONTENT | | $\alpha_1$ | $\alpha_2$ | $\alpha_3$ | $\alpha_4$ | $\alpha_5$ | $\alpha_6$ | ... |

FIG.10

| PROCESSING CONTENT | BACKGROUND-COLOR CORRECTING PROCESS | SPACE FILTERING PROCESS | RESOLUTION INCREASING PROCESS |
|---|---|---|---|
| $\alpha_1$ | BACKGROUND COLOR REMOVAL 3 | EDGE REINFORCEMENT 1 | INCREASE OF CHARACTER RESOLUTION 2 |
| $\alpha_2$ | * | SMOOTHING 3 | IMAGE INTERPOLATION 3 |
| $\alpha_3$ | BACKGROUND CLEANING 2 | * | * |
| ⋮ | ⋮ | ⋮ | ⋮ |

APPARATUS, METHOD, AND COMPUTER PROGRAM PRODUCT FOR ACQUIRING PROCESSING CONTENT FOR IMAGE DATA

CROSS-REFERENCE TO RELATED APPLICATIONS

The present application claims priority to and incorporates by reference the entire contents of Japanese priority documents 2007-183000 filed in Japan on Jul. 12, 2007 and 2008-109312 filed in Japan on Apr. 18, 2008.

BACKGROUND OF THE INVENTION

1. Field of the Invention

The present invention relates to an apparatus, a method, and a computer program product for processing an image.

2. Description of the Related Art

With the widespread use of a color scanner and a digital camera, in some cases, an input device and an output device for inputting and outputting image data are different with each other; for example, image data on an image shot by a digital camera is output by a printer. The output device normally outputs image data after a correction depending on a feature of image data, such as a correction of a background color is made on the image data. However, when an input device and an output device are different with each other, it may be difficult to identify a feature of image data.

To solve the problem, there has been developed various technologies. For example, there is an image processing apparatus capable of performing image processing on image data appropriately (see, for example, Japanese Patent Application Laid-open No. 2006-053690). In this apparatus, a processing history of, for example, "Undo" or "Redo" of each of processes and a processing state are managed with respect to, for example, image data on a color document input by an image input device, such as a scanner, so as to manage or process data for creating optimum image data depending on various applications. Furthermore, there is disclosed an image processing apparatus enabling a user to recognize a state transition of image processing visually and intuitively by outputting the state transition (see, for example, Japanese Patent Application Laid-open No. 2006-074331).

However, not only types of image data subject to image processing but also users' preferences and purposes of using the image data have been diversified. For example, as a background processing, there are a background color removal in which a color of a background is processed to be white regardless of an original color and a background cleaning in which dirt or a see-through backside image is processed not to be come out with keeping an original color of a background. A user can select any of such processing techniques depending on an individual preference. However, when an apparatus is configured that a user needs to select a content or a parameter for a desired image processing, a user operation is cumbersome and complicated, and thus an operating efficiency decreases.

SUMMARY OF THE INVENTION

It is an object of the present invention to at least partially solve the problems in the conventional technology.

According to an aspect of the present invention, there is provided an image processing apparatus including a change detecting unit that detects whether there is a change in processing content between a first period in which a first combination of feature and processing content of first image data is stored in a history-information storing unit and a second period in which a second combination of feature and processing content of second image data that is similar to the first image data is stored, which is later than the first period in terms of time; a history-information updating unit that updates the first combination to the second combination when a change in processing content is detected between the first period and the second period by the change detecting unit; an image-data acquiring unit that acquires a target image data to be processed; a processing-content acquiring unit that acquires a processing content for the target image data based on the combination of feature and processing content stored in the history-information storing unit; and a processing content output unit that outputs the processing content acquired by the processing-content acquiring unit.

Furthermore, according to another aspect of the present invention, there is provided an image processing method including detecting whether there is a change in processing content between a first period in which a first combination of feature and processing content of first image data is stored and a second period in which a second combination of feature and processing content of second image data that is similar to the first image data is stored, which is later than the first period in terms of time; updating the first combination to the second combination when a change in processing content is detected between the first period and the second period at the detecting; acquiring a target image data to be processed; acquiring a processing content for the target image data based on the combination of feature and processing content; and outputting the processing content acquired at the acquiring a processing content.

Moreover, according to still another aspect of the present invention, there is provided a computer program product including a computer-usable medium having computer-readable program codes embodied in the medium that when executed cause a computer to execute storing a combination of feature and processing content of image data; detecting whether there is a change in processing content between a first period in which a first combination of feature and processing content of first image data is stored and a second period in which a second combination of feature and processing content of second image data that is similar to the first image data is stored, the second period being later than the first period in terms of time; updating the first combination to the second combination when a change in processing content is detected between the first period and the second period at the detecting; acquiring a target image data to be processed; acquiring a processing content for the target image data based on the combination of feature and processing content; and outputting the processing content acquired at the acquiring a processing content.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table of an example of history information stored in the history DB;

FIG. 10 is a table of an example of processing contents stored in the history DB;

DETAILED DESCRIPTION OF THE PREFERRED EMBODIMENTS

Exemplary embodiments of the present invention are explained in detail below with reference to the accompanying drawings.

Figure 1:
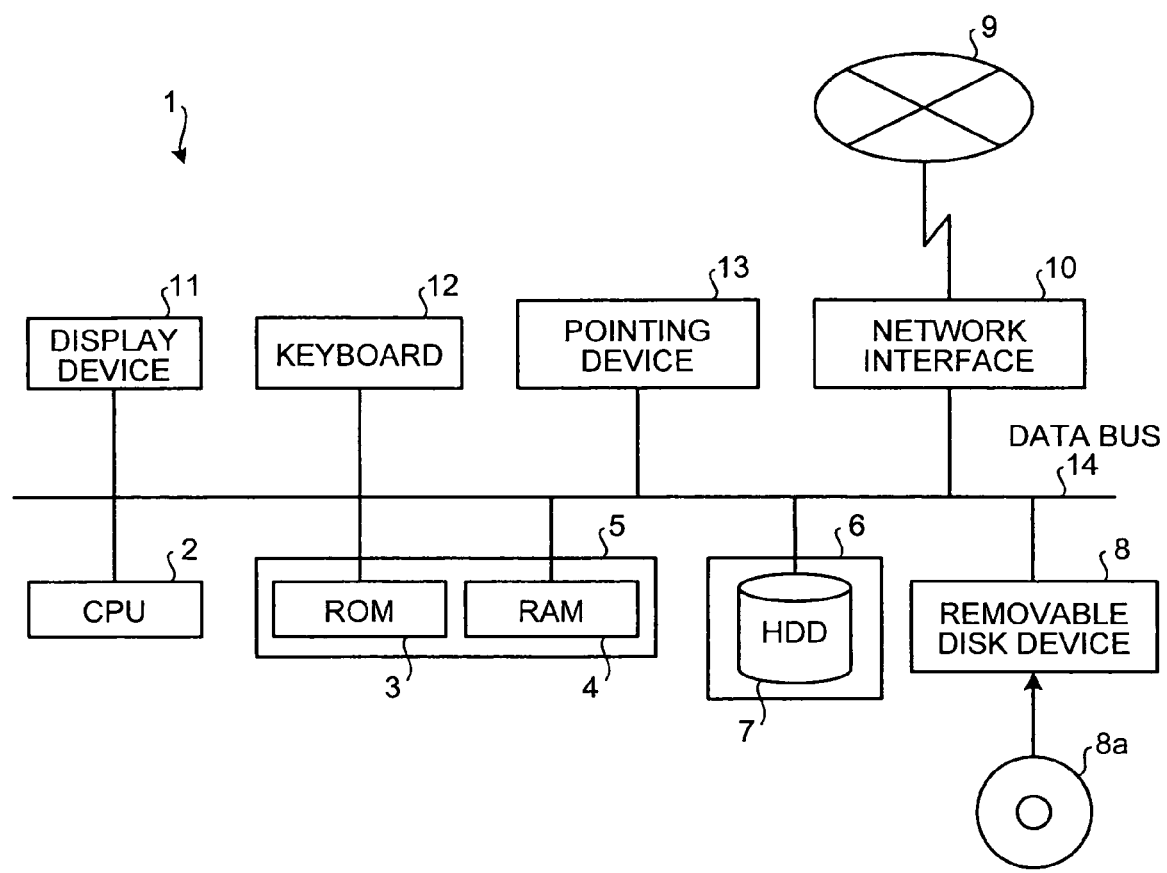
FIG. 1 is an electric connection diagram of an image processing apparatus according to a first embodiment of the present invention.

FIG. 1 is an electric connection diagram of an image processing apparatus 1 according to a first embodiment of the present invention. As shown in FIG. 1, the image processing apparatus 1 is a computer such as a personal computer (PC), and includes a central processing unit (CPU) 2, a primary storage unit 5, a secondary storage unit 6, a removable disk device 8, a network interface (I/F) 10, a display device 11, a keyboard 12, and a pointing device 13 such as a mouse. The CPU 2 centrally controls each of units in the image processing apparatus 1. The primary storage unit 5 includes a read-only memory (ROM) 3 and a random access memory (RAM) 4 for storing information therein. The secondary storage unit 6 includes a hard disk drive (HDD) 7 in which a data file (for, for example, image data on a color bitmapped image) is stored. The removable disk device 8 is, for example, a compact disk read-only memory (CD-ROM) drive, and stores information in a CD-ROM, distributes information to the external, or receives information from the external. The network I/F 10 is used for transmitting information by a communication with other external computer via a network 9. The display device 11 includes, for example, a cathode ray tube (CRT) or a liquid crystal display (LCD) on which a progress or a result of a process is displayed for an operator. The keyboard 12 is used when the operator inputs a command, information, or the like to the CPU 2. Data is transmitted/received among these components via a data bus 14.

In the present embodiment, the image processing apparatus 1 is applied to a commonly-used PC. However, the present invention is not limited to the PC. For example, the present invention can be applied to a handheld terminal referred to as a personal digital assistant (PDA), a palmtop PC, a mobile phone, a personal handyphone system (PHS), and the like.

When the image processing apparatus 1 is powered on by a user, the CPU 2 activates a loader that is a program stored in the ROM 3. After that, the HDD 7 loads an operating system, which is a program managing both computer hardware and computer software, on the RAM 4, and thereby running the operating system. In response to a user operation, the operating system starts a program, loads information, or stores the information. As major examples of the operating system, there are "Windows™", "UNIX™", and the like. An operation program run on the operating system is referred to as an application program.

The image processing apparatus 1 stores an image processing program as an application program in the HDD 7. Seen in this light, the HDD 7 serves as a storage medium for storing therein the image processing program.

In general, such an application program is recorded on a memory medium 8a, for example, an optical information recording medium such as a CD-ROM and a digital versatile disk ROM (DVD-ROM), or a magnetic recording medium such as a floppy disk (FD). The application program recorded on the memory medium 8a is installed on the HDD 7 or the like in the secondary storage unit 6. Therefore, the memory medium 8a having the portability can also be the storage medium for storing therein the application program. Alternatively, the application program can be stored on an external computer connected to a network such as the Internet so that the application program can be downloaded from the external computer via the network I/F 10 to be installed on the HDD 7 or the like in the secondary storage unit 6. Furthermore, the image processing program implemented by the image processing apparatus 1 can be provided or distributed to the external via the network such as the Internet.

When the image processing apparatus 1 runs the image processing program on the operating system, the CPU 2 centrally controls each of the units by performing each computing process in accordance with the image processing program. Out of computing processes performed by the CPU 2, a normalization process to be performed when image data is accumulated/transmitted, which is a process specific to the present embodiment, is explained below. The normalization process is a process of converting digital image data received from an external device connected to the image processing apparatus 1 (for example, a scanner or a digital camera) via the network 9 into an ideal form.

In a case where real-time processing is emphasized, the process needs to be performed at high speed. Therefore, it is preferable that a logic circuit (not shown) is additionally provided to the CPU 2 so that the CPU 2 performs the computing process by the use of the logic circuit.

Figure 2:
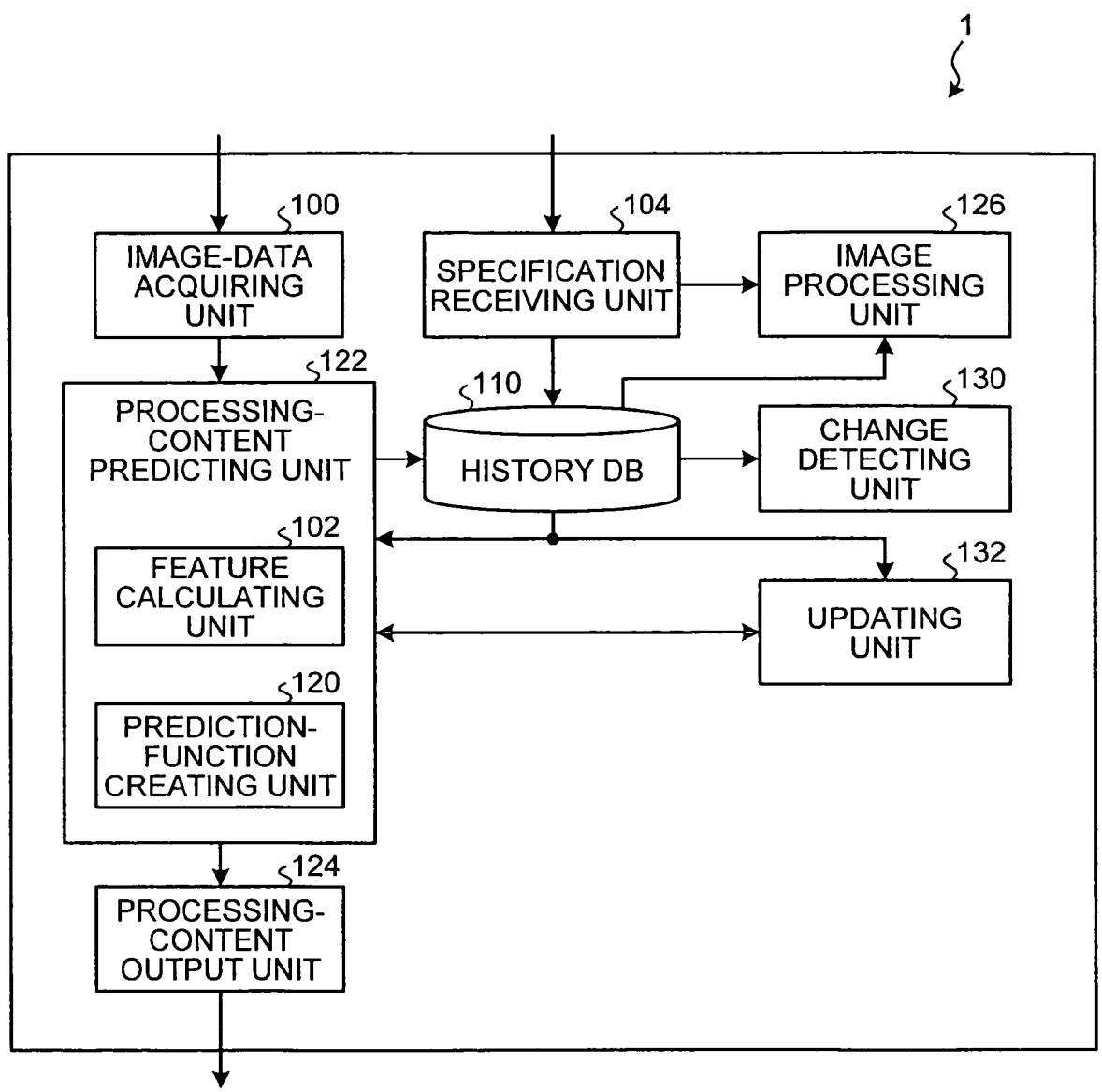
FIG. 2 is a functional block diagram of the image processing apparatus shown in FIG. 1.

Subsequently, image processing performed by the CPU 2 is explained below. FIG. 2 is a functional block diagram of the image processing apparatus 1. The image processing apparatus 1 includes an image-data acquiring unit 100, a feature calculating unit 102, a specification receiving unit 104, a history database (DB) 110, a prediction-function creating unit 120, a processing-content predicting unit (a processing-content acquiring unit) 122, a processing-content output unit 124, an image processing unit 126, a change detecting unit 130, and an updating unit 132.

The image-data acquiring unit 100 acquires image data. Furthermore, when input image data is a document, the image-data acquiring unit 100 corrects a skew of the document.

The feature calculating unit 102 calculates a feature of the whole image data. As features, for example, there are statistical information, such as a ratio of characters to a whole image, a ratio of pictures to the whole image, a degree of scattering of the characters and the pictures, and a layout density, a spatial distribution of the characters and the pictures, a color distribution, an edge distribution, and a color of a background.

The specification receiving unit 104 receives a specification of a processing content with respect to the image data acquired by the image-data acquiring unit 100. The specification of the processing content is input by the user. The processing content includes a type of processing, a parameter of the type, and the like. As types of processing, for example, there are a background-color correcting process, a space filtering process, and a resolution expansion process.

As the background-color correcting process, there are a background color removal in which a background color is processed to be while and a background cleaning in which a background color is corrected. A method for the background color removal is disclosed in, for example, Japanese Patent Application Laid-open No. 2004-320701 and Japanese Patent Application Laid-open No. 2005-110184. When a set of algorithms or parameters is denoted by "A", the background-color correcting process is defined as follows.

A={background color removal, background cleaning, do nothing}

As the space filtering process, there are a smoothing process, an edge enhancement process, and an adaptive filtering with respect to a whole target image to be processed. In the adaptive filtering, a different process is performed by each pixel. The detailed description of the adaptive filtering is disclosed in, for example, Japanese Patent Application Laid-open No. 2003-281526. The space filtering process is defined as follows.

A={smoothing process, edge enhancement process, adaptive filtering, do nothing}

As the resolution expansion process, for example, there are a process of increasing a resolution of characters as disclosed in Japanese Patent Application Laid-open No. 2005-063055 and a normal image interpolation. The resolution expansion process is defined as follows.

A={increase of character resolution, image interpolation, do nothing}

The history DB 110 stores therein a feature obtained by the feature calculating unit 102 and a processing content specified by a user with respect to predetermined image data in an associated manner by each of users (by each of user IDs assigned to the users). The history DB 110 stores therein a combination of the feature and the processing content in temporal sequence of which the processing content is specified by the user. In other words, the history DB 110 stores therein history information H as expressed by $$H=\{(x(1), a(1)),(x(2),a(2)), \ldots \} \quad (1)$$

where "$x(k)$" indicates a feature extracted from a k-th set of image data, and "$\alpha(k)(\alpha \in A)$" indicates an algorithm or a processing parameter, i.e., a processing content suitable for the image data.

The prediction-function creating unit 120 creates a prediction function for identifying a processing content with respect to newly-acquired image data based on the feature and the processing content stored in the history DB 110.

The processing-content predicting unit (the processing-content acquiring unit) 122 includes the feature calculating unit 102 and the prediction-function creating unit 120. The processing-content predicting unit (the processing-content acquiring unit) 122 predicts an optimum processing content with respect to target image data subject to the prediction based on the feature calculated by the feature calculating unit 102 and the prediction function created by the prediction-function creating unit 120.

The processing-content output unit 124 displays the optimum processing content predicted by the processing-content predicting unit (the processing-content acquiring unit) 122 on a display screen.

The image processing unit 126 performs image processing on the image data in accordance with the specification of the processing content received by the specification receiving unit 104.

The change detecting unit 130 detects whether there is any change between a first relation between image data and a processing content that are stored in the history DB 110 in a first period and a second relation between image data and a processing content that are stored in the history DB 110 in a second period following the first period. The image data includes a feature of the image data.

The updating unit 132 updates the contents stored in the history DB 110 based on a result of the detection by the change detecting unit 130.

Figure 3:
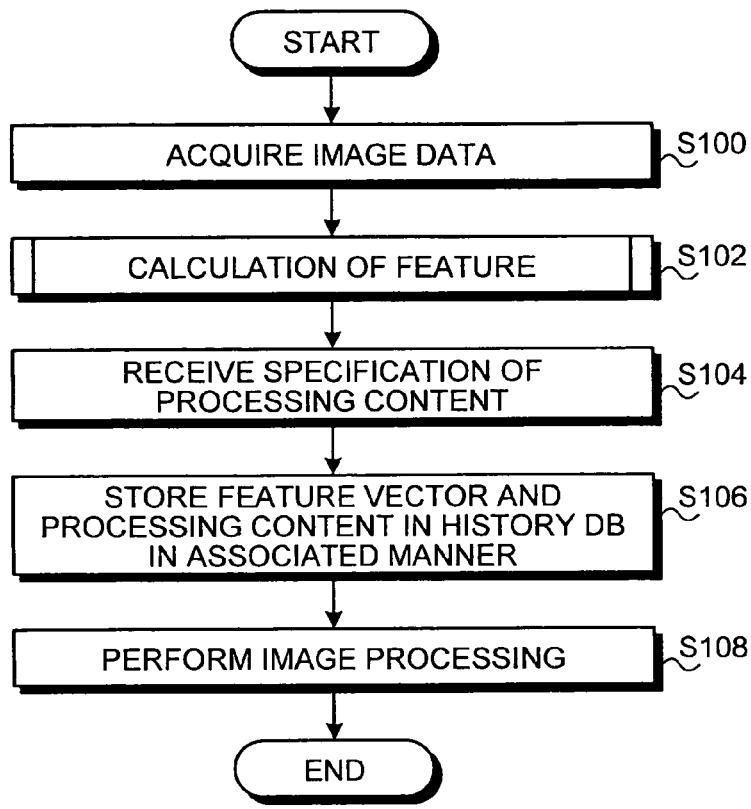
FIG. 3 is a flowchart of a history storing process for storing a feature vector and a processing content in a history database (DB) performed in the image processing apparatus shown in FIG. 2.

FIG. 3 is a flowchart of a history storing process of storing a feature vector and a processing content in the history DB 110 performed by the image processing apparatus 1. First, the image-data acquiring unit 100 acquires image data (Step S100). Then, the feature calculating unit 102 calculates a feature vector of the image data acquired by the image-data acquiring unit 100 (Step S102). The specification receiving unit 104 receives a specification of a processing content for image processing with respect to the image data acquired by the image-data acquiring unit 100 (Step S104).

The feature vector calculated by the feature calculating unit 102 and the specified processing content received by the specification receiving unit 104 are stored in the history DB 110 in an associated manner (Step S106). Namely, "$x(k)\alpha(k)$" is added to the history information H. The image processing unit 126 performs image processing on the image data in accordance with the specified processing content (Step S108).

Figure 4:
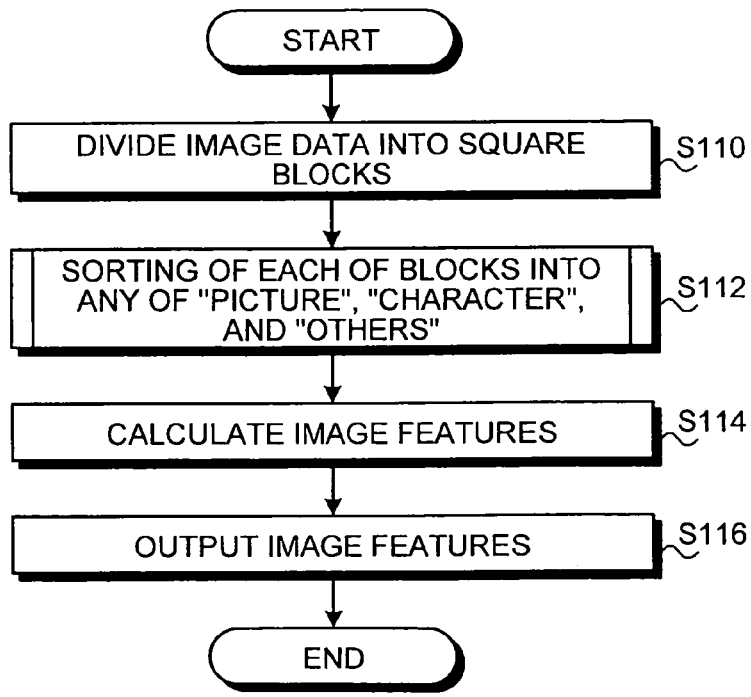
FIG. 4 is a flowchart for explaining a feature calculating process in the history storing process shown in FIG. 3 in detail.

FIG. 4 is a flowchart for explaining a feature calculating process (Step S102) in the history storing process shown in FIG. 3 in detail. The feature calculating unit 102 divides the image data acquired by the image-data acquiring unit 100 into equal-sized square blocks exclusively (Step S510). Specifically, the feature calculating unit 102 divides the image data into equal-sized square blocks of, for example, 1 square centimeter (1 cm×1 cm) (i.e., 80×80 pixels at the resolution of 200 dots per inch (dpi), or 120×120 pixels at the resolution of 300 dpi).

Figure 5:
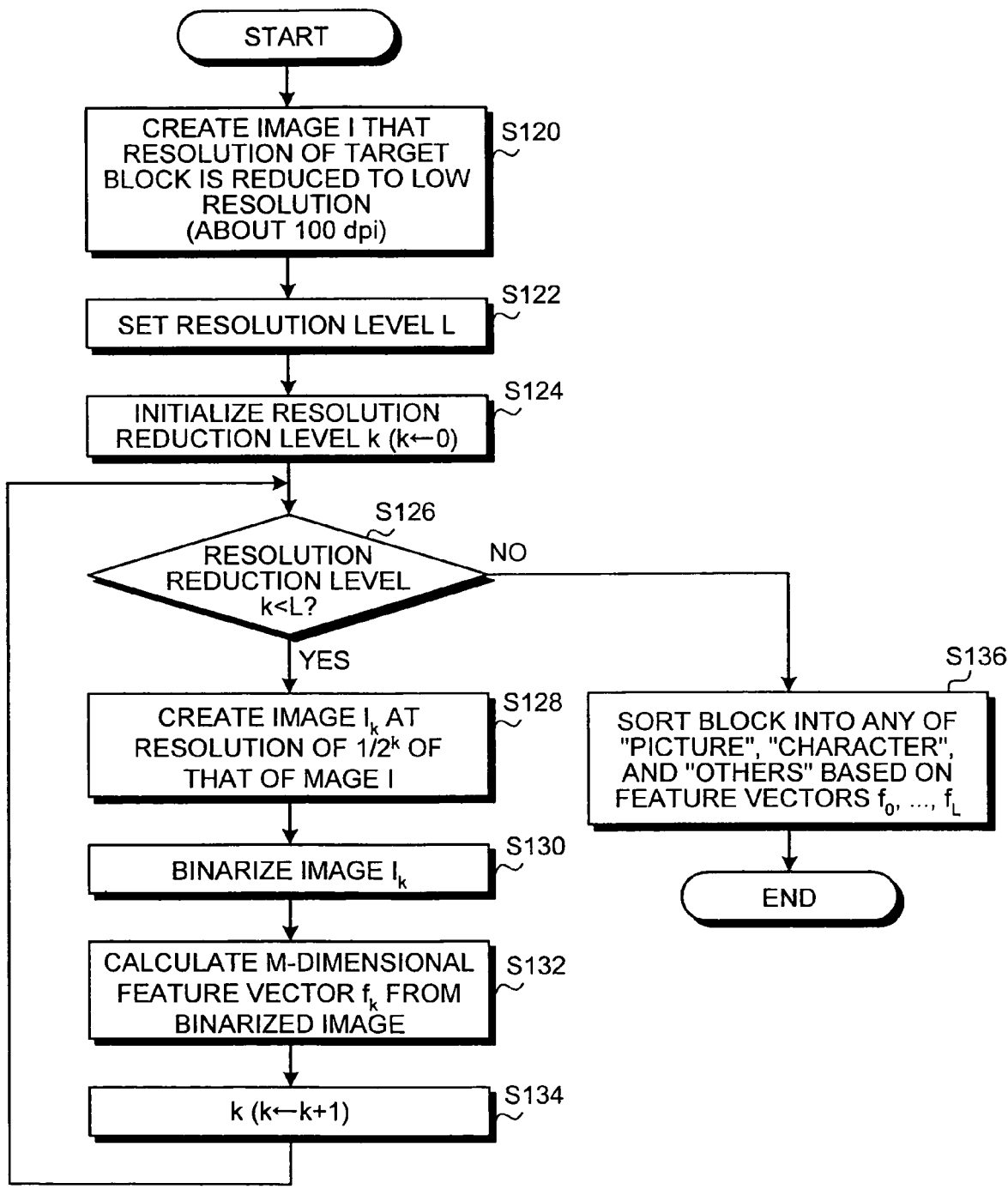
FIG. 5 is a flowchart for explaining a sorting process in the feature calculating process shown in FIG. 4 in detail.
Figure 6:
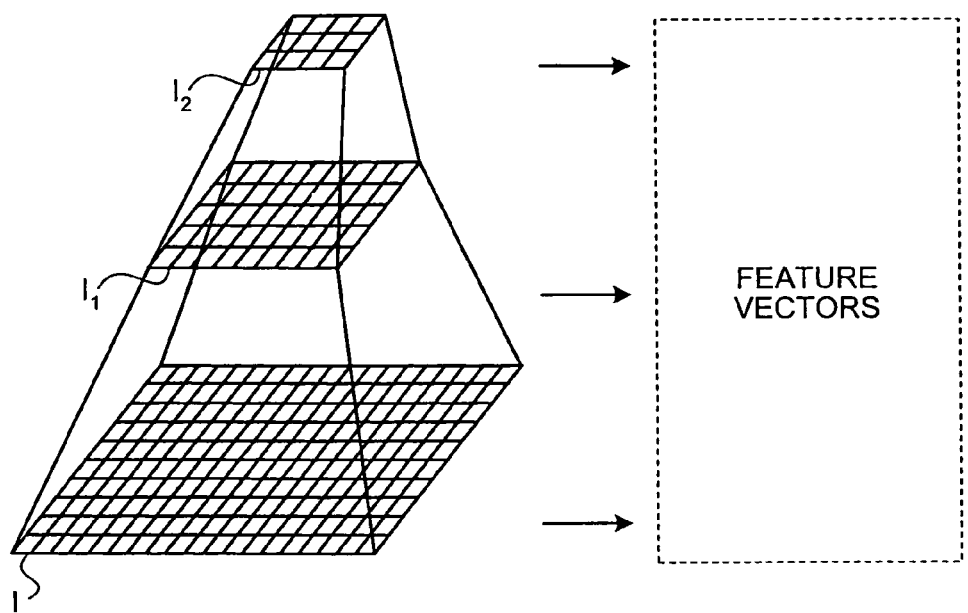
FIG. 6 is a pattern diagram for explaining a multiresolution decomposing process in the sorting process shown in FIG. 5.

Each of the blocks is sorted into any of the following three types, "picture", "character", and "others" (Step S112). Specifically, as explained in a flowchart shown in FIG. 5, an image I that a resolution of a target image block to be processed is reduced to a low resolution of about 100 dpi is created (Step S120), and at the same time, a resolution level L is set (Step S122), and a resolution reduction level k is initialized (k←0) (Step S124). The processes at Steps S120 to S124 are performed to extract a feature from not only the image I but also the image which resolution is reduced to the low resolution as shown in FIG. 6. For example, when the resolution level L is set to 2, a feature is extracted from each of the image I, an image $I_1$ having a one-half resolution of that of the image I, and an image $I_2$ having a one-fourth resolution of that of the image I.

When the resolution reduction level k does not reach the resolution level L (YES at Step S126), an image $I_k$ (k=0, ..., L) at a resolution of $1/2^k$ of that of the image I created at Step S120 is created (Step S128). Then, the image $I_k$ is binarized (Step S130). In the binarized image, it is assumed that a black pixel is expressed by 1, and a white pixel is expressed by 0.

After an M-dimensional feature vector $f_k$ is obtained from the binarized image $I_k$ at the resolution of $1/2^k$ (Step S132), the resolution reduction level k is incremented by 1 (k←k+1) (Step S134).

Figure 7:
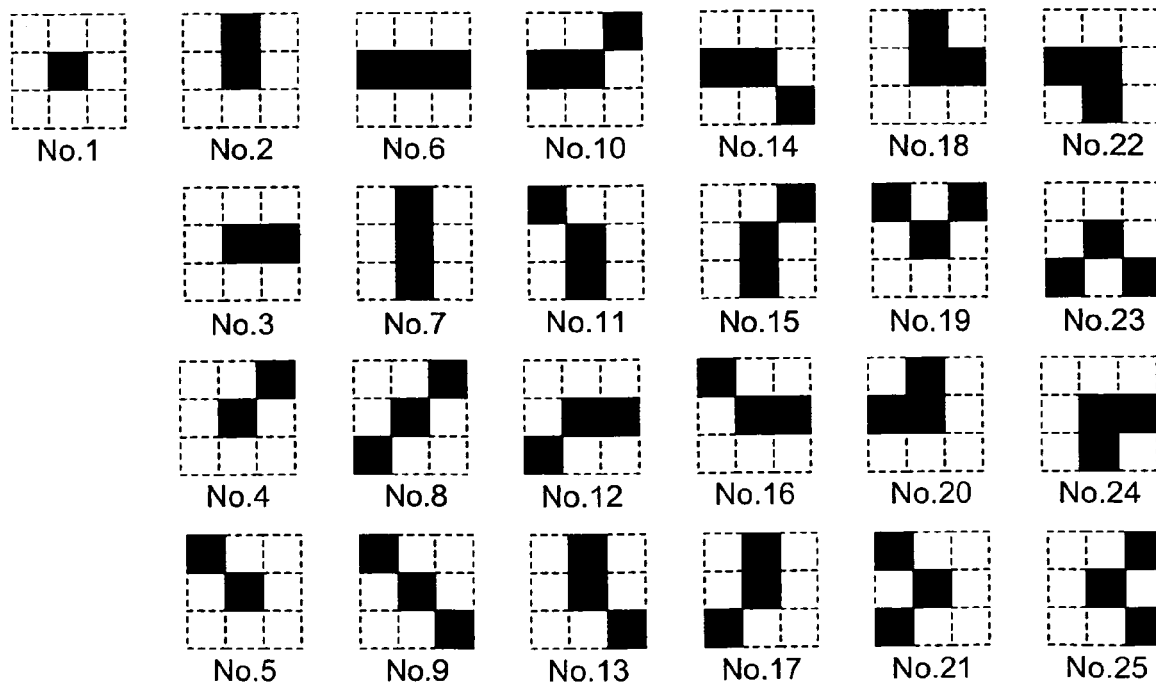
FIG. 7 is a schematic diagram of an example of mask patterns for calculating a higher-order autocorrelation function.
Figure 8A:
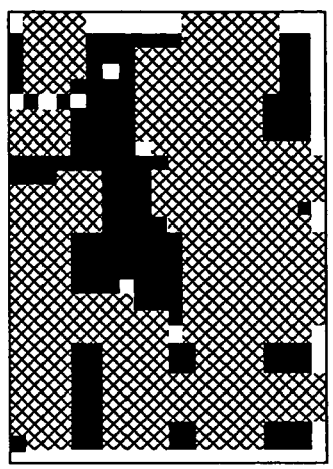
FIG. 8 is a pattern diagram of an example of sorted blocks.
Figure 8B:
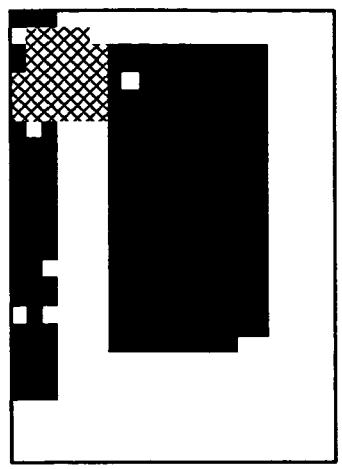
Figure 8C:
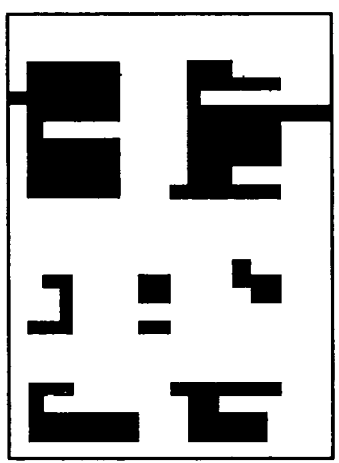
Figure 8D:
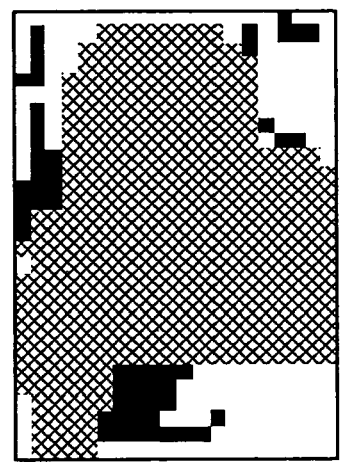
Figure 8E:
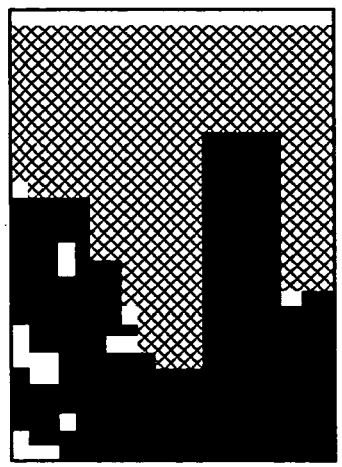
Figure 8F:
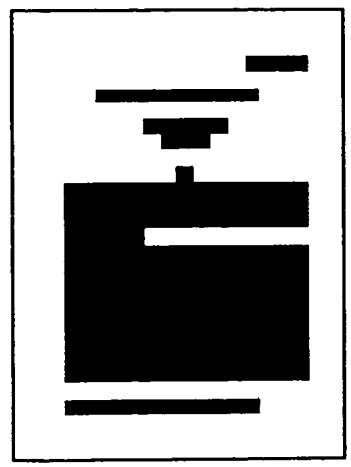

A method of extracting a feature from an image that the image $I_k$ (k=0, ..., L) is binarized is explained below. When a target image on the screen is referred to as an image I(r), "a higher-order autocorrelation function (an N-order autocorrelation function)" that an autocorrelation function is extended to a higher order (an N-order) with respect to a displacement vector $(S_1, S_2, \ldots, S_N)$ is defined by $$z^N(s_1, s_2, \ldots, s_N) = \Sigma I(r)I(r+s_1)\ldots I(r+s_N) \quad (2)$$

where a sum Σ is a total sum of pixels "r" of a whole image. Therefore, an infinite number of higher-order autocorrelation functions are obtained from the image depending on the order or the displacement vector $(S_1, S_2, \ldots, S_N)$. In the present embodiment, for sake of simplicity, it is assumed that the order N of the higher-order autocorrelation function is up to 2, and also the displacement vector is limited to be within an area of 3×3 pixels around a reference pixel r locally. When identical features due to the parallel displacement are eliminated, as shown in FIG. 7, the number of features with respect to the binarized image is 25 in total. The calculation of each of the features can be made in such a manner that the product of pixels corresponding to a local pattern is added up by the times with respect to the whole image. For example, a feature of a local pattern "No. 3" is calculated in such a manner that the product sum of a gray value of the reference pixel r and a gray value of a pixel located on the immediate right of the reference pixel r with respect to the whole image is calculated. In this manner, from the image at the resolution of $1/2^k$, the 25-dimensional (M=25) feature vector $f_k$ is calculated by $$f_k = (g(k,1), \ldots, g(k,25)) \quad (3)$$

The processes at Steps S128 to S134 are repeated until the resolution reduction level k incremented at Step S134 exceeds the resolution level L.

When the resolution reduction level k incremented at Step S134 exceeds the resolution level L (NO at Step S126), the block is sorted into any of the following three types, "picture", "character", and "others" based on the feature vectors $f_0, \ldots, f_L$ (Step S136).

A method of sorting a block is explained in detail below. First, a (25×L)-dimensional feature vector x=(g(0, 1), ..., g(0, 25), ..., g(L, 1), ..., g(L, 25)) is created based on the 25-dimensional feature vector $f_k$=(g(k, 1), ..., g(k, 25)) (k=0, ..., L). To sort the block based on the feature vector x, it is necessary to provide a learning function in advance. In the present embodiment, data for the learning function is divided into two types, i.e., data including only characters and the other data that does not include the characters to calculate a feature vector x. After that, an average feature vector $p_0$ of pixels of the data including the characters (hereinafter, "character pixels") and an average feature vector $p_1$ of pixels of the other data (hereinafter, "non-character pixels") are calculated in advance. The feature vector x obtained from the image block to be sorted is broken down to a linear combination of the given feature vectors $p_0$ and $p_1$, so that their combination coefficients $a_0$ and $a_1$ can indicate a ratio between the character pixels and the non-character pixels, or either "a probability of characters" or "a probability of non-characters". Such a breakdown can be made when a feature based on a higher-order local autocorrelation remains unchanged in a target position on the screen and also has the additivity with respect to a target number. The feature vector x is broken down by $$x = a_0 \cdot p_0 + a_0 \cdot p_1 = F^T a + e \quad (4)$$

where "e" indicates a vector error, and "F" is defined by $$F = [p_0, p_1]^T, a = (a_0, a_1)^T \quad (5)$$

With the least-squares method, an optimum combination coefficient vector "a" is obtained by $$a = (FF^T)^{-1} \cdot F_x \quad (6)$$

A threshold process is applied to a parameter $a_1$ indicating the "probability of non-characters" by each of the blocks, whereby each of the blocks is sorted into any of "picture", "non-picture", and "unknown". When the block is sorted into any of "unknown" and "non-picture", and a parameter $a_0$ indicating the "probability of characters" exceeds a threshold, the block is sorted into "character". When the block is sorted into any of "unknown" and "non-picture", and the parameter $a_0$ does not exceed the threshold, the block is sorted into "others". FIG. 8 is a pattern diagram of an example of sorted blocks. In the example shown in FIG. 8, a black portion indicates "character", a gray portion indicates "picture", and a white portion indicates "others".

To return to the explanation of the flowchart shown in FIG. 4, after each of the blocks is sorted into any of the following three types, "picture", "character", and "others", about twenty image features are calculated based on a result of the sorting of all the blocks (Step S114). As the image features, for example, there are ratios of characters and pictures, a layout density (a degree of squeezing characters and pictures into a narrow space), and a degree of scattering of characters and pictures (a degree of scattering distribution of characters and pictures). Specifically, following five values are calculated as the image features. The feature calculating unit 102 calculates various image features including but not limited to the five values. The feature calculating unit 102 extracts about twenty numbers of features, i.e., about 20-dimensional features. It is preferable to use as many features as possible from a viewpoint of creating such a prediction function that an optimum processing content is selected based on a history of specifications of processing contents by a diversity of users.

1. Character ratio Rt∈[0, 1]: a ratio of blocks sorted into "character" to all the blocks 2. Non-character ratio RP∈[0, 1]: a ratio of blocks sorted into "picture" to all the blocks 3. Layout density D∈[0, 1]: the sum of areas of blocks sorted into "character" and "picture" is divided by a drawing area 4. Degree of scattering of characters St(>0): as for a spatial distribution of character blocks in x and y directions, a variance-covariance matrix is normalized by an area of an image 5. Degree of scattering of non-characters Sp(>0): as for a spatial distribution of picture blocks in x and y directions, a variance-covariance matrix is normalized by an area of an image FIG. 9 is a table of an example of history information stored in the history DB 110. In the example shown in FIG. 9, image data, features obtained from the image data, and a processing content specified with respect to the image data are stored in an associated manner. As the processing content specified with respect to the image data, there are, for example, a background-color correcting process (a background color removal, a background cleaning), a space filtering process (a smoothing process, an edge enhancement process, adaptive filtering), and a resolution expansion process (an increase of a character resolution, an image interpolation) (see FIG. 10). Furthermore, as shown in FIG. 10, the processing content specified with respect to the image data includes not only the processing content but also a parameter. For example, 3 of "background color removal 3" and 1 of "edge enhancement 1" indicate a parameter, respectively.

Figure 11:
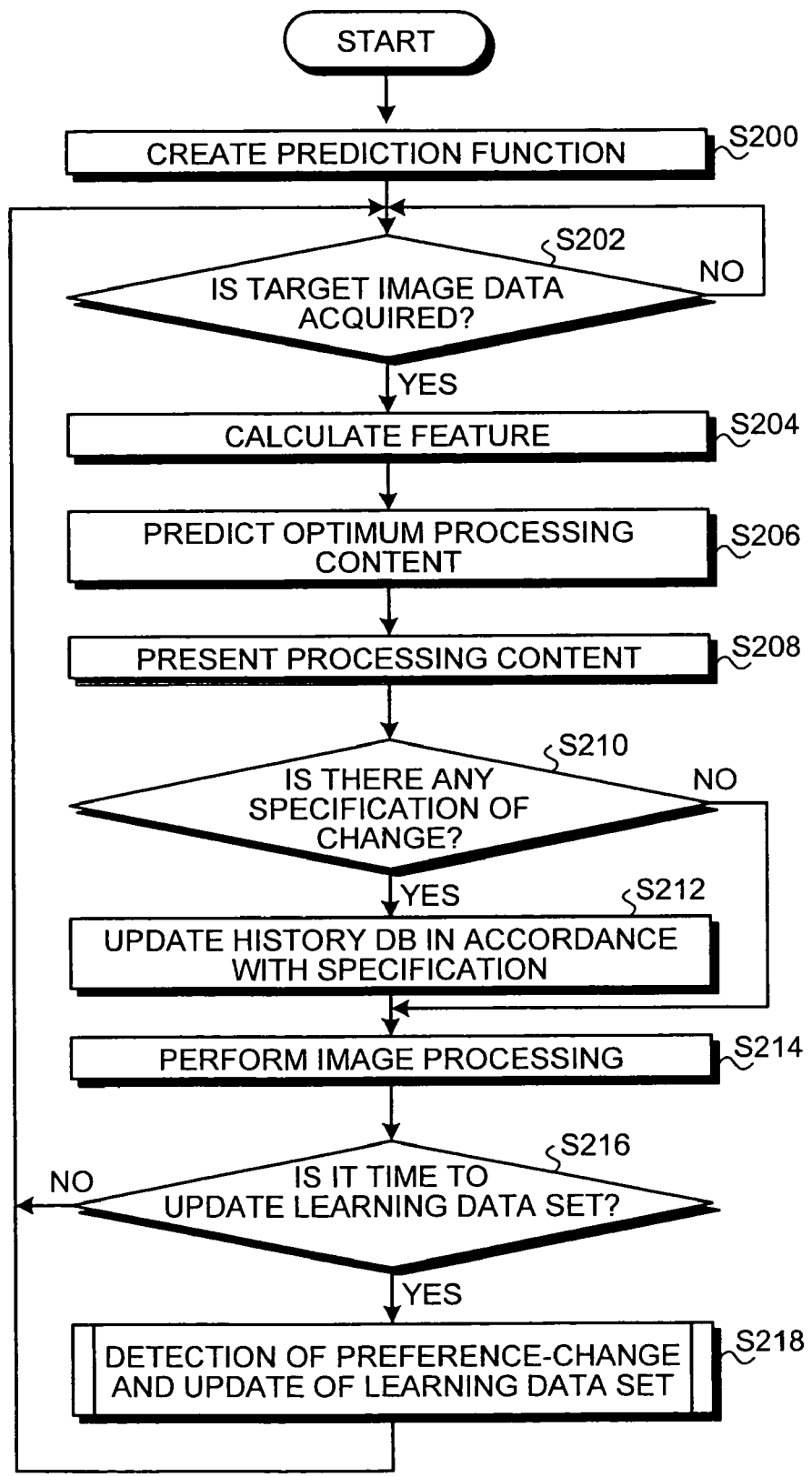
FIG. 11 is a flowchart of a processing-content predicting process for presenting an optimum processing content to a user based on a prediction function.

FIG. 11 is a flowchart of a processing-content predicting process for presenting an optimum processing content to a user based on a prediction function. When history information H with respect to predetermined sets of image data, for example, 20 sets of image data is used, an optimum prediction function can be obtained. Therefore, when the history information H with respect to the predetermined sets of image data is stored, the processing-content predicting process is initiated.

First, the prediction-function creating unit 120 creates a prediction function for predicting a processing content with respect to image data based on the history information H stored in the history DB 110 (Step S200). The prediction function is a function obtained from the history information H by the learning function. In other words, the history information H stored in the history DB 110 is used as a learning data set for creating the prediction function. The prediction function is created by application of the nearest neighbor algorithm based on learning of a weighted distance.

When a feature set F indicating an image content, an algorithm set A indicating a processing content and a parameter, and the history information H are obtained, a function "f" indicating a suitability $f_H(\alpha, x, u)$ of an algorithm $\alpha \in A$ with respect to a feature x obtained from given unknown image data is created as the prediction function. The function $f_H$ is expressed by $$f_H : A \times R^N \times U \to R \text{ (R is a real number)} \quad (7)$$

A different function $f_H$ is created by each algorithm set A. In other words, a function $f_H$ of an algorithm set A for "the background-color correcting process" is different from a function $f_H$ of an algorithm set A for "the space filtering process".

However, there is a following technical problem. Based on the Bayesian classification technique, when a user is denoted by "u", an image feature is denoted by "x", and a process is denoted by "α", a suitability $f_H(\alpha, x, u)$ can be formulated as $$p(\alpha|u,x) = p(\alpha|u) \cdot p(x|\alpha,u) / p(x|\alpha,u) = p(\alpha|u) \cdot p(x|\alpha,u) / \Sigma_\alpha p(\alpha|u) \cdot p(x|\alpha,u) \quad (8)$$

where "P(x|u)" is a normalized factor for the image. Therefore, when priorities of a plurality of processes a are determined, the normalized factor "P(x|u)" can be ignored. In this case, a suitability $f_H(\alpha, x, u)$ is obtained by $$f_H(\alpha x, u) = p(\alpha|u) \cdot p(x|\alpha,u) \quad (9)$$

The normalized factor "P(x|u)" can be easily obtained from the history information H. Each of processing contents α is recorded together with the number of times that the process is specified by each of users. A feature distribution p(x|α, u) of an image to which a user u applies a processing content α is referred to as the history information H.

However, when a prediction function is created, following four points need to be considered.

1. The history information H stored in the history DB 110 is dependent on a preference and a task of a user of the image processing apparatus 1. Therefore, on-site online learning is required.

2. It should be assumed that in the image processing apparatus 1, history information used for the learning is relatively little (dozens to a hundred sets of data). This is because on-site support is required to respond immediately by reading out a user's preference or task from as little data as possible.

3. A feature space is a multidimensional (about 20-dimensional) space. Therefore, only features suitable for the prediction are to be selected, so that it is necessary to provide a feature selecting mechanism for eliminating a disturbing factor, or to weight each feature dimension. Furthermore, it is necessary to consider that a feature subset suitable for the prediction differs depending on an individual object to be selected or a user.

4. A feature is a continuous and multidimensional feature. Furthermore, the number of sets of data is little. In this case, it is really difficult to obtain a feature distribution p(x|α, u). Due to the "curse of dimension", it is difficult to estimate the feature distribution p(x|α, u) by the application of the non-parametric Parzen window or the expectation-maximization (EM) algorithm for assuming the Gaussian mixture model.

On the other hand, the nearest neighbor algorithm is suitable for on-site learning. The nearest neighbor algorithm is a prediction method with the most similar case in the past to a currently-processing case, so that as the number of sets of similar data increases, the prediction accuracy is improved. Furthermore, the nearest neighbor algorithm is a pattern recognition method that does not require an estimation of a probability distribution, such as a Gaussian distribution.

As for the issues of little learning data and the multidimensional feature, a dilemma between the number of sets of data and the number of dimensions can be solved in such a manner that a distance scale in the nearest neighbor algorithm is weighted depending on a degree of contribution to a prediction of each feature dimension or a degree of importance of each learning data (a combination of a feature and a processing content). Therefore, in the present embodiment, the nearest neighbor algorithm based on learning of a weighted distance is employed.

In the nearest neighbor algorithm based on learning of a weighted distance, when a distance between a prototype point and a predicted target point is calculated, not a simple Euclidean distance but a weighted distance depending on a degree of importance of the prototype point and a degree of importance of the predicted target point is calculated.

An i-th prototype point $x_i$ is defined by Equation (10), and a predicted target point, i.e., a given point "y" to be identified is defined by Equation (11). In this case, the prototype point $x_i$ corresponds to each feature α included in the history information H, and the given point y corresponds to a feature a obtained from target image data.

$$x_i = (x_{i1}, \ldots, x_{id}) \quad (10)$$

$$y = (y_1, \ldots, y_d) \quad (11)$$

Furthermore, it is assumed that a class is referred to as "c". The class denotes an element of a set A, i.e., an index of an algorithm or a processing parameter to be applied. Each of prototype points $x_i$ is associated with class information indicating a class specified by a user.

A square (Δ) of a distance between the i-th prototype point $x_i$ and the given point y ($\Delta(y, x_i)$) is calculated by Equation (12) based on a weight $w_{cj}$ of a j-th feature dimension with respect to the class c and a weight $v_i$ of the i-th prototype point $x_i$.

$$\Delta(y, x_i) = \frac{1}{v_i^2} \sum_{j=1}^{d} w_{cj}^2 (y_j - x_{ij})^2 \qquad (12)$$

When it is assumed that the number of a feature dimension is denoted by "d", the number of sets of data is denoted by "N", and a class number is denoted by "C", the number of parameters is the sum of "N" for a weight of the prototype point and "Cd" for a weight of each dimension determined by each class. Namely, the number of parameters is obtained by "N+Cd".

The weights $v_i$ and $w_{cj}$ in Equation (12) are automatically obtained from data by the learning function. As a learning criterion an error rate evaluated by the leave-one-out method is minimized. Specifically, the weights $v_i$ and $w_{cj}$ are obtained by the learning function with the steepest descent method under the following four criteria.

1. It is assumed that points in the same class as a predetermined prototype point are sparsely distributed, and a result of identification varies depending on either existence or nonexistence of the prototype point. In this case, it can be determined that the prototype point greatly affects a prediction function of a processing content, i.e., the prototype point has a high degree of importance. Therefore, to expand an area affected by the prototype point, the weight $v_i$ is increased.

2. It is assumed that points in the same class as a predetermined prototype point are close-packed, and a degree of impact on a result of discrimination caused by existence of the prototype point is low. In this case, it can be determined that the prototype point has a low degree of importance. Therefore, the weight $v_i$ is decreased.

3. As for a predetermined class c, when a j-th feature dimension greatly affects the prediction, the weight $w_{cj}$ is increased.

4. As for a class c, when a j-th feature dimension is a factor in disturbing the prediction, the weight $w_{cj}$ is vanishingly small.

The nearest neighbor algorithm based on learning of a weighted distance is described in "Learning weighted metrics to minimize nearest-neighbor classification error", by R. Paredes & E. Vidal, IEEE Transactions on Pattern Analysis and Machine Intelligence, vol. 28, no. 7, pp. 1100-1110, July 2006.

After the prediction function is created, the image-data acquiring unit 100 acquires target image data subject to the prediction (YES at Step S202), and the feature calculating unit 102 calculates a feature of the target image data acquired by the image-data acquiring unit 100 (Step S204). The calculation of the feature is performed in the same manner as the feature calculating process shown in FIG. 4.

Then, the processing-content predicting unit (the processing-content acquiring unit) 122 predicts an optimum processing content with respect to the target image data (Step S206). Specifically, the processing-content predicting unit (the processing-content acquiring unit) 122 inputs the feature with respect to the target image data calculated by the feature calculating unit 102, and predicts an optimum processing content, i.e., an algorithm or a processing parameter with respect to the target image data based on a prediction function. A square (Δ) of a distance between an i-th prototype point $x_i$ (a class level of the i-th prototype point $x_i$ is c) and a feature y obtained from the target image data is calculated by Equation (12) based on a weight $v_i$ of the i-th prototype point $x_i$ obtained by the prediction-function creating unit 120 and a weight $w_{cj}$ of a j-th feature dimension with respect to the class c. The processing-content predicting unit (the processing-content acquiring unit) 122 identifies such a prototype point that a distance between the prototype point and a prediction target point is minimized. Then, the processing-content predicting unit (the processing-content acquiring unit) 122 identifies a recommended algorithm or a recommended parameter for the feature in the class level.

In other words, a most approximate feature to the feature of the target image data is extracted from those of image data stored in the history DB 110. The processing-content predicting unit (the processing-content acquiring unit) 122 predicts a processing content a associated with the most approximate feature as an optimum processing content with respect to the target image data, and acquires the processing content a from the history DB 110.

The processing-content output unit 124 presents the optimum processing content a acquired by the processing-content predicting unit (the processing-content acquiring unit) 122 to a user (Step S208).

In this manner, the optimum processing content is presented to the user. If the processing content is a desired processing content, the user selects the processing content so as to apply the processing content to the image data. Therefore, the user can avoid the trouble of having to input a processing content or a parameter each time image data is input.

On the other hand, if the presented processing content is not the desired processing content, the user can specify another optimum processing content or parameter with a user interface, such as a keyboard or a mouse.

When the specification receiving unit 104 receives a specification of change in the processing content together with a user ID from the user (YES at Step S210), the specification receiving unit 104 updates a content of the history DB 110 in accordance with the specification (Step S212). In this case, the specification of change indicates that a different processing content from the presented processing content is to be applied to the image data. The specification of change includes a processing content that the user specifies to change the presented processing content thereto. Specifically, the feature obtained from the target image data and the processing content included in the specification of change are newly added to the history information H. When the specification receiving unit 104 does not receive any specification of change (NO at Step S210), the process control goes to Step S214.

In accordance with the specified processing content, image processing is performed on the target image data (Step S214). When it is a time to update the learning data set (YES at Step S216), the change detecting unit 130 detects whether there is any change in the preference and updates the data set (Step S218). Then, the process control returns to Step S202 again. The timing of updating the learning data set is set up, for example, after a lapse of a predetermined time from a time when the learning data set is updated previously.

Alternatively, it is also possible to update the learning data set, for example, when combinations of a feature and a processing content with respect to predetermined sets of image data are newly added to the history DB 110 after the learning data set is set or the learning data set is updated.

Furthermore, it is also possible to update the learning data set every time a combination of a feature and a processing content with respect to image data is newly added to the history DB 110. In this manner, the timing of update can be set to any timing as long as it is a predetermined timing.

Figure 12:
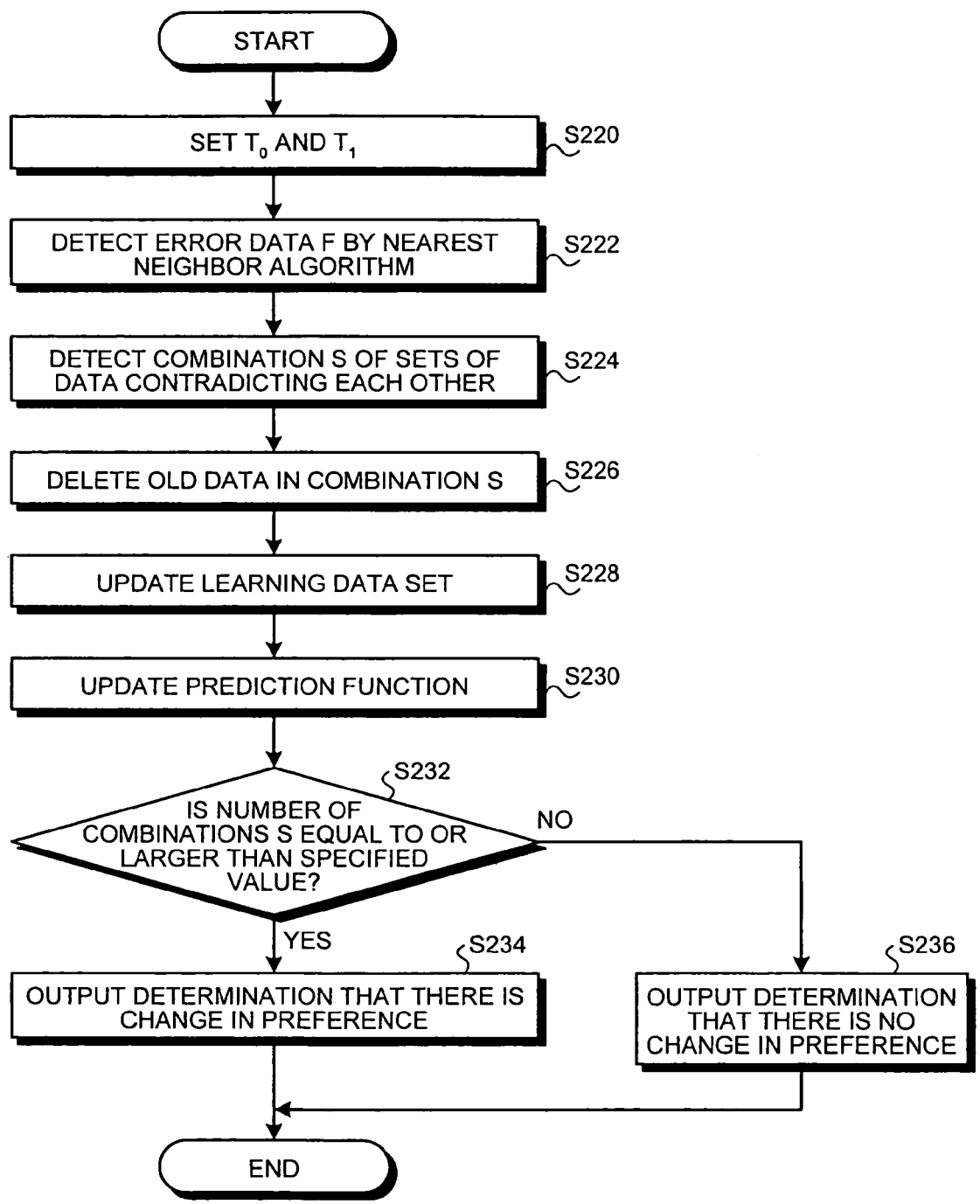
FIG. 12 is a flowchart for explaining a preference-change detecting process and a learning-data-set updating process in the processing-content predicting process shown in FIG. 11 in detail.

FIG. 12 is a flowchart for explaining a preference-change detecting process and a learning-data-set updating process (Step S218) in the processing-content predicting process shown in FIG. 11 in detail. The change detecting unit 130 detects whether there is any change in the preference by detecting whether a different processing content from that with respect to specified image data is combined with image data having a similar feature to that of the specified image data.

Learning data set $T_0$ used when the prediction function is created previously (Step S200 or S224) is set up in advance. Furthermore, data set $T_1$ added to the history information H in the history DB 110 after the prediction function is created previously is set up (Step S220). A prediction function created based on the learning data set $T_0$ is referred to as "$P_0$". The learning data set $T_0$ is expressed by $$T_0=\{(x_i,y_i): xi\ \text{indicatesa feature}, y_i\ \text{indicatesa selectedcase(processing content)}\} \quad (13)$$

Subsequently, error data F is detected (Step S222). Specifically, by the application of the nearest neighbor algorithm, the most approximate data other than the learning data set $T_0$ and the data set $T_1$ is obtained from factors meeting "$T0 \cup T1$" (the leave-one-out method). At this time, "$T_0 \cup T_1$" is indexed. Specifically, from 1 to $|T_0|$ are referred to as factors of the learning data set $T_0$, and from $|T_0|+1$ to $|T_1|$ are referred to as factors of the data set $T_1$.

The error data F is obtained by Equation (14). In this case, the error data F indicates data that is not properly recognized by the nearest neighbor algorithm. In other words, the error data F is such data that a selected case (a processing content) recorded in association with the most approximate data other than the data differs from an actually-selected processing content.

$$F=\{((i, y_i, k: i\ \text{indicates an index of wrong data}, y_i\ \text{indicates correct data with respect to}\ i, k\ \text{indicates an index of a nearest neighbor point with respect to}\ i)) \quad (14)$$

Then, a combination S of sets of data contradicting each other is detected (Step S224). The combination S is such a combination of sets of data that although a distance between the data is not far, selections of learning data set $T_0$ and data set $T_1$ differ between the data. In other words, the combination S is such a combination of sets of data that although a feature of each of the data is approximate, a processing content associated with each of the features differs between the data.

The combination S is defined by $$S=\{(i,k):(i,y_i,k)\in F, (k,y_k,i)\in F, y_i\neq y_k, i\leq |T_0|\ \&\ k>|T_0|\} \quad (15)$$

where "i" and "k" are the nearest neighbor points for each other in the combination S, which belong to learning data set $T_0$ and data set $T_1$, respectively. However, a selected case differs between "i" and "k", so that when the learning data set T and the data set $T_1$ are combined with each other, the learning data set $T_0$ and the data set $T_1$ negatively affect each other. Therefore, it is determined as the combination of sets of data contradicting each other.

Figure 13:
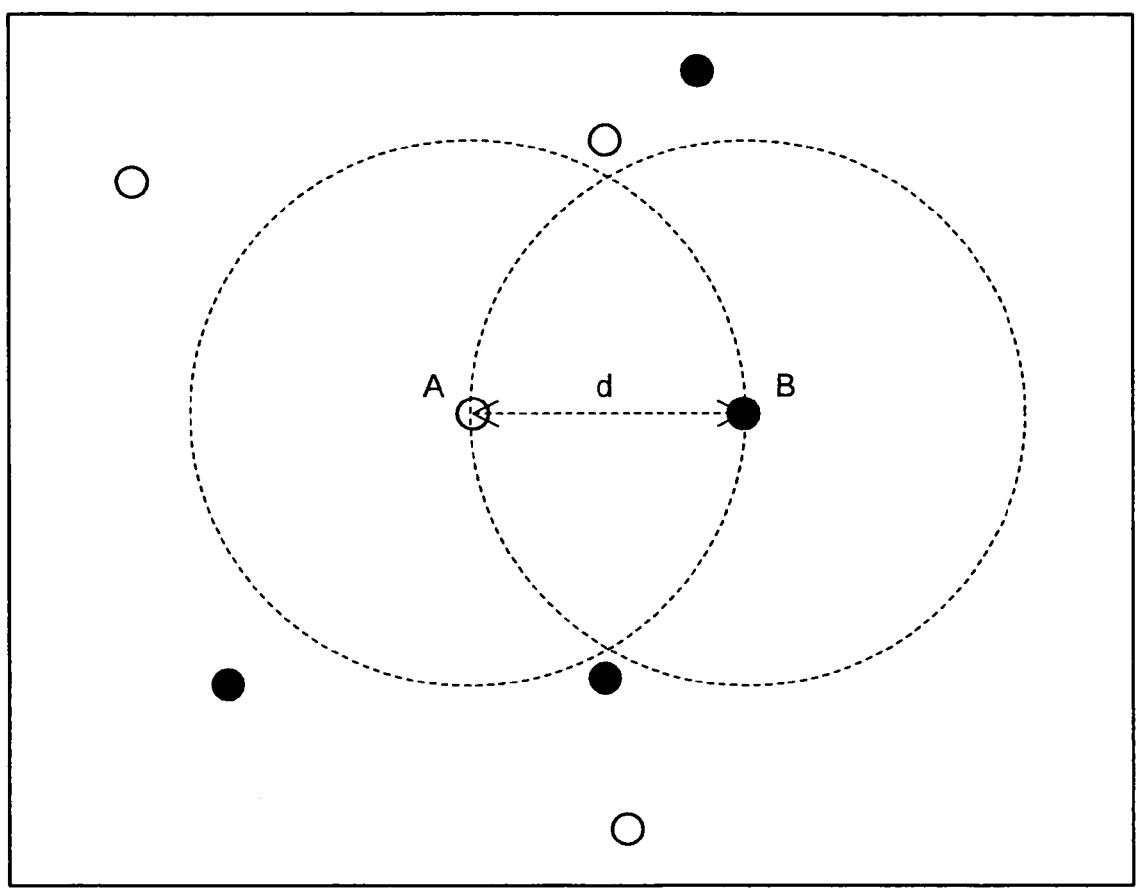
FIG. 13 is a schematic diagram for explaining a combination S.

FIG. 13 is a schematic diagram for explaining the combination S. In FIG. 13, white dots indicate learning data sets $T_0$, and black dots indicate data sets $T_1$. A distance between data A on the learning data set $T_0$ and data B on the data set $T_1$ is referred to as "d". It is assumed that there is no other data in areas of a circle with radius d centering around a point A and a circle with radius d centering around a point B, and a selected case differs between the points A and B. In this case, a combination of the data A and the data B is added to a set S.

To return to the explanation of the flowchart shown in FIG. 12, after the combination S is detected (Step S224), old data included in the combination S is deleted from data included in the learning data set $T_0$ (Step S226). In other words, a process as expressed by Equation (16) is performed.

$$T_0 \leftarrow T_0 - \{(x_i, y_i):(i,k) \in S\} \quad (16)$$

Then, data that the learning data set $T_0$ from which the old data is deleted and the data set $T_1$ are combined is referred to as the learning data set. In other words, the learning data set is updated (Step S228). The prediction-function creating unit 120 creates a prediction function based on the newly-set learning data set. In other words, the prediction-function creating unit 120 updates the prediction function (Step S230). The process of creating the prediction function is performed in the same manner as the prediction-function creating process at Step S200 as explained with reference to the flowchart shown in FIG. 11.

When the number of combinations S is equal to or larger than a predetermined specified value (YES at Step S232), it is determined that there is a change in the preference, and outputs the determination to notify the user (Step S234). On the other hand, when the number of combinations S is smaller than the specified value (NO at Step S232), it is determined that there is no change in the preference, and outputs the determination to notify the user (Step S236). Then, the preference-change detecting process is terminated (Step S218).

The processes explained above can be altered or modified.

Figure 14:
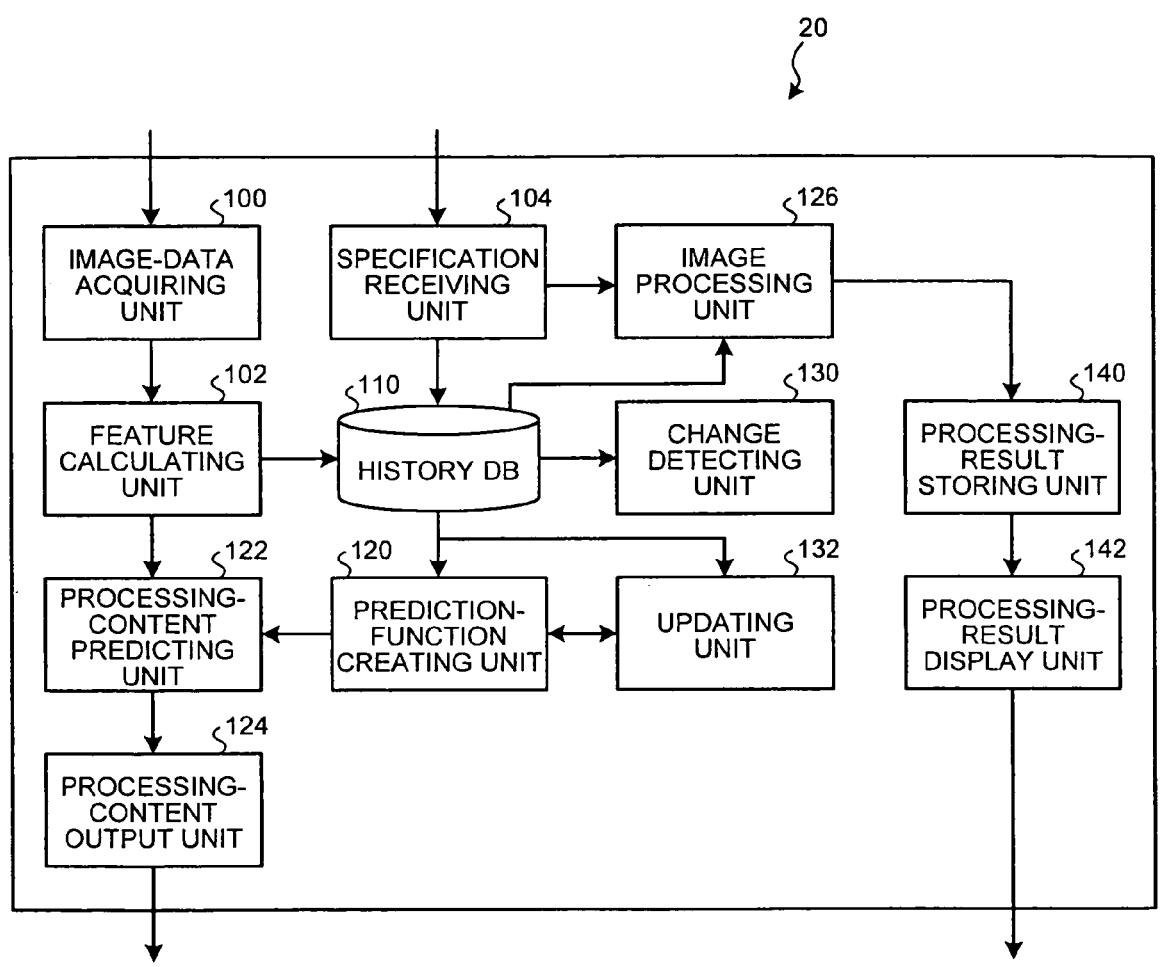
FIG. 14 is a functional block diagram of an image processing apparatus according to a second embodiment of the present invention.

Subsequently, an image processing apparatus 20 according to a second embodiment of the present invention is explained below. The image processing apparatus 20 performs a processing-content predicting process in batches with respect to a plurality of sets of target image data. FIG. 14 is a functional block diagram of the image processing apparatus 20. A difference between the image processing apparatus 20 and the image processing apparatus 1 is that the image processing apparatus 20 further includes a processing-result storing unit 140 and a processing-result display unit 142. Portions identical to those in FIG. 2 are denoted with the same reference numerals, and the description of those portions is omitted. The processing-result storing unit 140 stores therein a processing result of image processing performed by the image processing unit 126. The processing-result display unit 142 displays the processing result stored in the processing-result storing unit 140.

Figure 15:
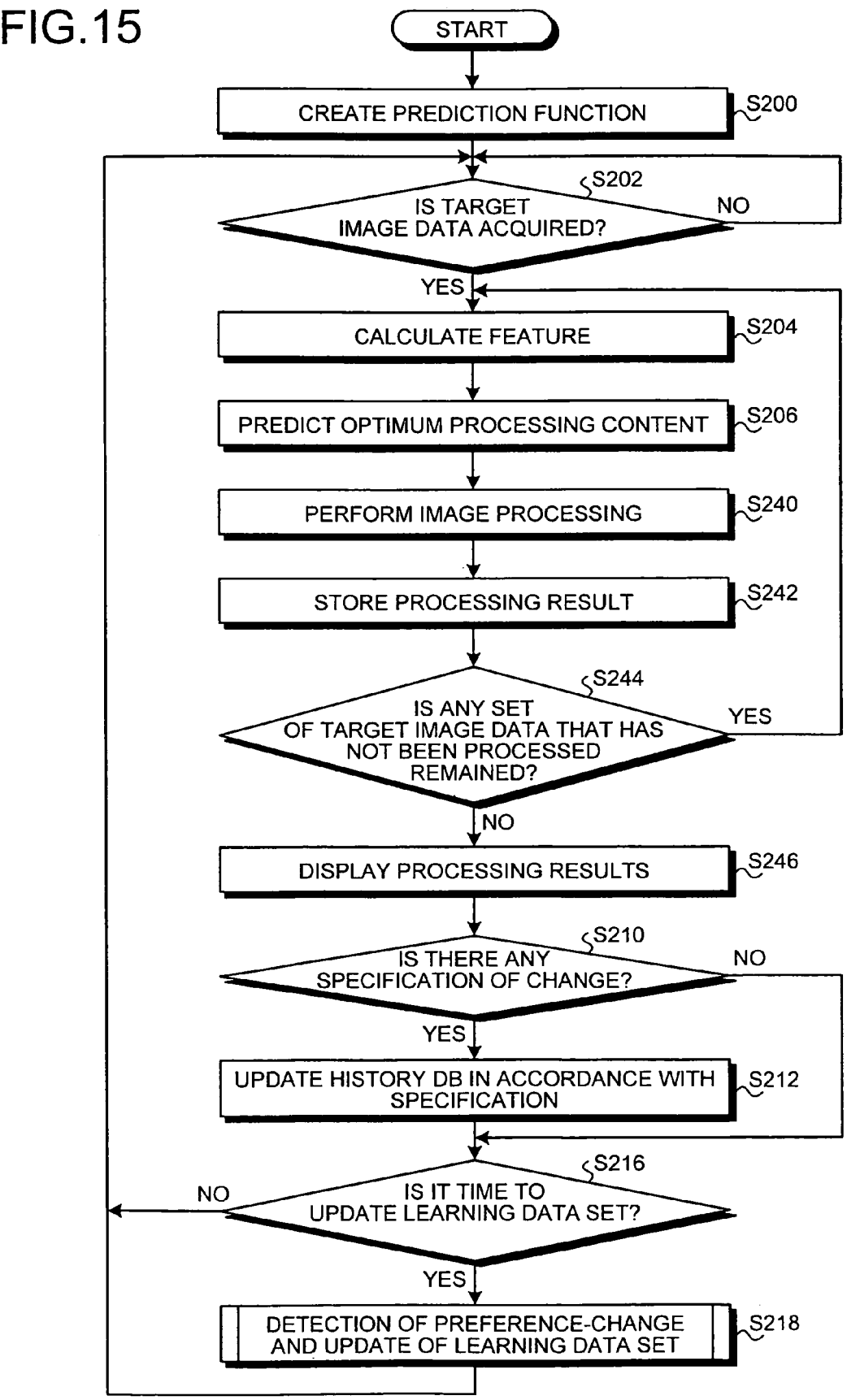
FIG. 15 is a flowchart of a processing-content predicting process performed by the image processing apparatus shown in FIG. 14.

FIG. 15 is a flowchart of the processing-content predicting process performed by the image processing apparatus 20. Steps identical to those in FIG. 11 for the first embodiment are denoted with the same reference numerals, and the description of those steps is omitted. After an optimum processing content is predicted (Step S206), image processing is actually performed on each of sets of target image data in accordance with the predicted processing content (Step S240). A processing result of the image processing is stored in, for example, the primary storage unit 5. When any set of target image data that the image processing has not been performed is remained (YES at Step S244), the process control goes to Step S204 to perform the processes at the Steps S204 to S242 on the target image data that the image processing has not been performed.

When the image processing has been performed on all the sets of target image data (NO at Step S244), processing results for all the sets of target image data are displayed (Step S246). Then, the processes at Steps S210 to S218 are performed.

In this manner, in the image processing apparatus 20 according to the second embodiment, a processing result of image processing is displayed, so that the user can determine whether a processing content is to be changed based on the processing result. Furthermore, the processing-content predicting process is performed in batches with respect to a plurality of sets of target image data, so that the processes can be performed efficiently.

Figure 16:
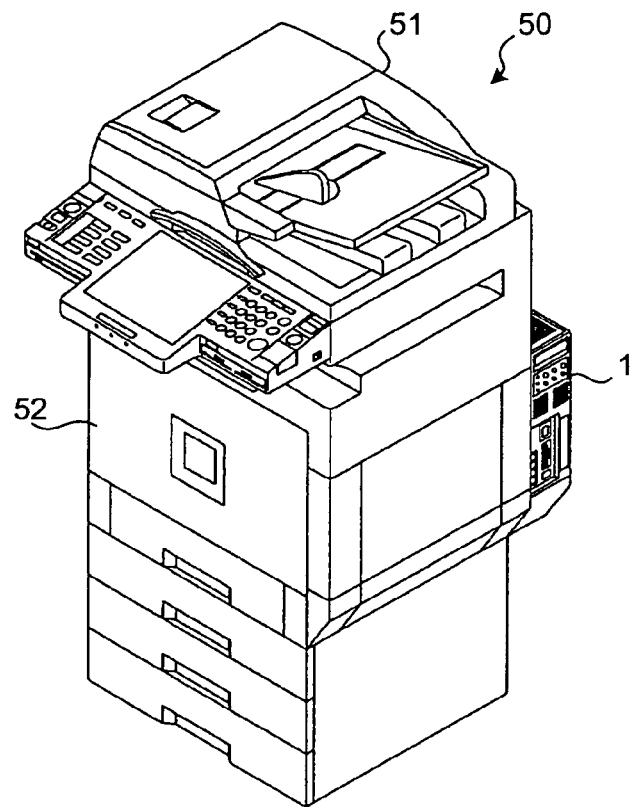
FIG. 16 is a schematic diagram of a multifunction product according to a third embodiment of the present invention.

FIG. 16 is a schematic diagram of a multifunction product (MFP) 50 according to a third embodiment of the present invention. The MFP 50 includes a scanner unit 51 as an image reading unit and a printer unit 52 as image printing unit. The MFP 50 further includes the image processing apparatus 1. More specifically, the image-data acquiring unit 100 in the image processing apparatus 1 acquires image data on an image read by the scanner unit 51 as target image data. The image processing apparatus 1 performs processes for prediction of a processing content to be applied to the acquired image data.

A configuration of the MFP 50 and processes performed by the MFP 50 other than those explained above are identical to those of the image processing apparatus 1, and the description of those portions is omitted.

Figure 17:
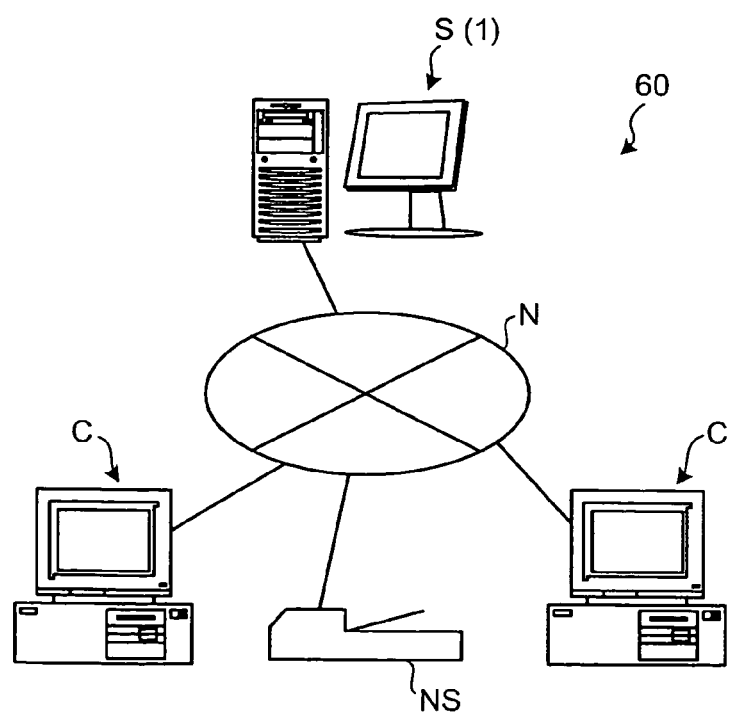
FIG. 17 is a system configuration diagram of an image processing system according to a fourth embodiment of the present invention.

FIG. 17 is a system configuration diagram of an image processing system 60 according to a fourth embodiment of the present invention. The image processing system 60 is a client server system in which a server computer S is connected to a plurality of client computers C via a network N. The server computer S performs the same processes as the image processing apparatus 1. Each of the client computers C transmits an image to the server computer S. The server computer S includes the same functions as the image processing apparatus 1. A network scanner NS is connected to the network N, so that the image-data acquiring unit 100 in the server computer S can acquire image data from each of the client computers C or the network scanner NS.

The history DB 110 can be stored in a server (not shown) of other computer, i.e., other than the server computer S.

A configuration of the image processing system 60 and processes performed by the image processing system 60 other than those explained above are identical to those of the image processing apparatus 1, and the description of those portions is omitted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a change detecting unit configured to detect whether there is a change in processing content between a first period in which a first combination of feature and processing content of first image data is stored in a history-information storing unit and a second period in which a second combination of feature and processing content of second image data that is similar to the first image data is stored, the second period being later than the first period in terms of time;
   a history-information updating unit configured to update the first combination to the second combination if a change in processing content is detected between the first period and the second period by the change detecting unit;
   an image-data acquiring unit configured to acquire a target image data to be processed;
   a processing-content acquiring unit configured to acquire a processing content for the target image data based on at least the second combination of feature and processing content stored in the history-information storing unit, the processing content acquiring including,
      a prediction-function creating unit configured to create a prediction function for predicting the processing content for the target image data based on at least the second combination of feature and processing content stored in the history-information storing unit, the prediction-function creating unit is configured to create the prediction function such that a prediction error with respect to the second combination of feature and processing content stored in the history-information storing unit is minimized; and
   a processing-content output unit configured to output the processing content acquired by the processing-content acquiring unit.

2. The image processing apparatus according to claim 1, wherein
   the processing-content acquiring unit includes
      a feature calculating unit configured to calculate a feature of the target image data, and
   the processing-content acquiring unit is configured to acquire the processing content for the target image data based on the prediction function created by the prediction-function creating unit and the feature calculated by the feature calculating unit.

3. The image processing apparatus according to claim 1, further comprising:
   a specification receiving unit configured to receive a specification of the processing content for the target image data from a user, wherein
   the change detecting unit is configured to detect whether there is a change in processing content with respect to the processing content for the target image data specified by the user.

4. The image processing apparatus according to claim 1, wherein
   the processing-content acquiring unit includes,
      a feature calculating unit configured to calculate a feature of the target image data, and
   the processing-content acquiring unit is configured to acquire the processing content for the target image data based on the prediction function created by the prediction-function creating unit and the feature calculated by the feature calculating unit, the feature includes a plurality of features, and
   the prediction-function creating unit is configured to identify a first feature having a larger contribution to a prediction of the processing content for the image data from among the features, and creates the prediction function such that a weight of the first feature is larger than weights of other features.

5. The image processing apparatus according to claim 4, wherein the prediction-function creating unit is configured to create the prediction function by using a nearest neighbor algorithm incorporating a learning of a weighted distance.

6. The image processing apparatus according to claim 1, wherein
   the processing-content acquiring unit includes,
      a feature calculating unit configured to calculate a feature of the target image data, and
   the processing-content acquiring unit is configured to acquire the processing content for the target image data based on the prediction function created by the prediction-function creating unit and the feature calculated by the feature calculating unit, and the prediction-function creating unit is configured to identify one combination of feature and processing content stored in the history-information storing unit having a larger contribution to a prediction of the processing content for the image data from among at least the first and second combinations, and create the prediction function such that a weight of the one combination of feature and processing content -is larger than weights of other combinations.

7. The image processing apparatus according to claim 1, wherein the prediction-function creating unit is configured to create the prediction function by using a steepest descent method.

8. The image processing apparatus according to claim 1, wherein the change detecting unit is configured to detect whether there is a change in processing content when the second period has passed.

9. The image processing apparatus according to claim 1, wherein the second period is a period in which a number of combinations are stored in the history-information storing unit.

10. The image processing apparatus according to claim 1, wherein the second period is a time period.

11. The image processing apparatus according to claim 1, further comprising:
   an image processing unit configured to perform an image processing on the target image data according to the processing content acquired by the processing-content acquiring unit; and
   an output unit configured to output a result of the image processing by the image processing unit.

12. The image processing apparatus according to claim 1, wherein the history-information storing unit is configured to store therein the second combination of feature and processing content of image data for each user.

13. An image processing method comprising:
   detecting whether there is a change in processing content between a first period in which a first combination of feature and processing content of first image data is stored and a second period in which a second combination of feature and processing content of second image data that is similar to the first image data is stored, the second period being later than the first period in terms of time;
   updating the first combination to the second combination if a change in processing content is detected between the first period and the second period at the detecting;
   acquiring a target image data to be processed;
   acquiring a processing content for the target image data based on at least the second combination of feature and processing content, the acquiring a processing content for the target image data including,
      creating a prediction function for predicting the processing content for the target image data based on at least the second combination of feature and processing content stored in the history-information storing unit, a prediction error with respect to the second combination of feature and processing content stored in the history-information storing unit is minimized; and
   outputting the processing content acquired at the acquiring a processing content.

14. A non-transitory computer program product comprising a computer-usable medium having computer-readable program codes embodied in the medium that when executed cause a computer to execute:
   detecting whether there is a change in processing content between a first period in which a first combination of feature and processing content of first image data is stored and a second period in which a second combination of feature and processing content of second image data that is similar to the first image data is stored, the second period being later than the first period in terms of time;
   updating the first combination to the second combination if a change in processing content is detected between the first period and the second period at the detecting;
   acquiring a target image data to be processed;
   acquiring a processing content for the target image data based on at least the second combination of feature and processing content, the acquiring a processing content for the target image data including,
      creating a prediction function for predicting the processing content for the target image data based on at least the second combination of feature and processing content stored in the history-information storing unit, a prediction error with respect to the second combination of feature and processing content stored in the history-information storing unit is minimized; and
   outputting the processing content acquired at the acquiring a processing content.

* * * * *